Figure 1:
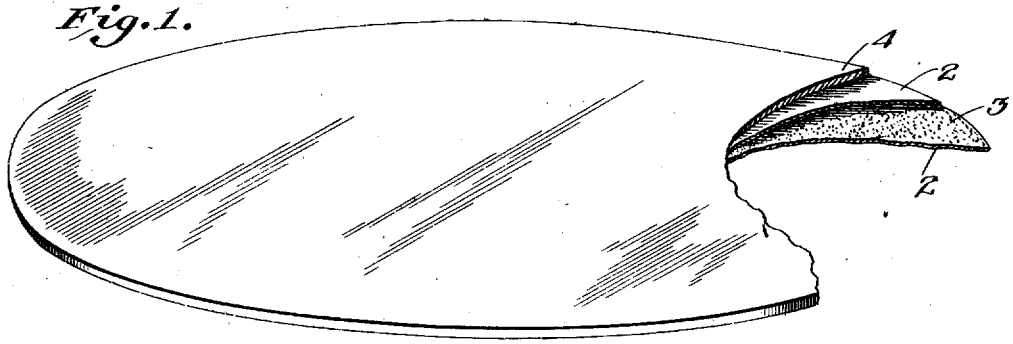

P. POETSCHKE.
PHONOGRAPH RECORD AND METHOD OF MAKING THE SAME.
APPLICATION FILED NOV. 12, 1917.

1,274,324.

Patented July 30, 1918.

Inventor
Paul Poetschke

UNITED STATES PATENT OFFICE.

PAUL POETSCHKE, OF MILFORD, DELAWARE.

PHONOGRAPH-RECORD AND METHOD OF MAKING THE SAME.

1,274,324.　　　　　Specification of Letters Patent.　　Patented July 30, 1918.

Application filed November 12, 1917. Serial No. 201,580.

*To all whom it may concern:*

Be it known that I, PAUL POETSCHKE, a citizen of the United States, residing at Milford, in the county of Sussex and State of Delaware, have invented certain new and useful Improvements in Phonograph-Records and Methods of Making the Same; and I do hereby declare the following to be a full, clear, and exact description of the invention, such as will enable others skilled in the art to which it appertains to make and use the same.

This invention relates to sound records and a method for making the same.

In the following specification and claims, the words "sound records" are utilized in the sense of meaning the article upon which the sound record may be or upon which the sound record is made.

Phonograph records are now manufactured usually, entirely of an integral body of one homogeneous composition of material, or a body or base having a facing or coating to receive the record.

One of the objects of my present invention is to produce a body or base for sound records, which may be faced with any suitable or usual sound impression receiving material such for instance, as shellac, phenol-formaldehyde condensation products, or rosin, or waxy compositions. Therefore, my invention has the further object of providing for the manufacture of sound or phonograph records at a less expense, than where the same are made as usual of an integral, homogeneous body, of the impression receiving material.

A further object of the invention is to provide for the manufacture of sound records of stronger construction, and therefore, which will not be so apt to warp or break as a wholly wax-like article.

Therefore, according to my method, I construct a body or base for the record, by building the same up of a plurality of layers of fibrous sheet material or paper, which are cemented together by cementitious plastic material of the nature of artificial stone which is self-hardening and strengthens, reinforces, and increases the rigidity of the base. By constructing a base of layers and cement, the desired degree of resiliency is produced which could not be obtained if either cement or paper alone is utilized in the base element. The cement to which I refer and which I use, is to be distinguished from glue or an adhesive in that it has the properties of artificial stone and will harden in a period of time which is controlled by the degree of heat to which it is subjected, the higher the heat, more rapid being the process of setting of the material, and the reference to paper is intended to include paper of any suitable material or combinations of material and also various fibrous sheets or layers.

Therefore, with the above objects in view, as will be more fully explained hereinafter, and as clearly understood by those skilled in the art, the invention consists in the method and the article produced thereby, and which consists in erecting a base of sheets of fibrous material or paper, cemented together by a plastic cementitious material of the property or characteristic of an artificial stone, which body is allowed to harden and then has applied to it the coating or facing to receive the sound record or impression.

Figure 2:
Figure 3:
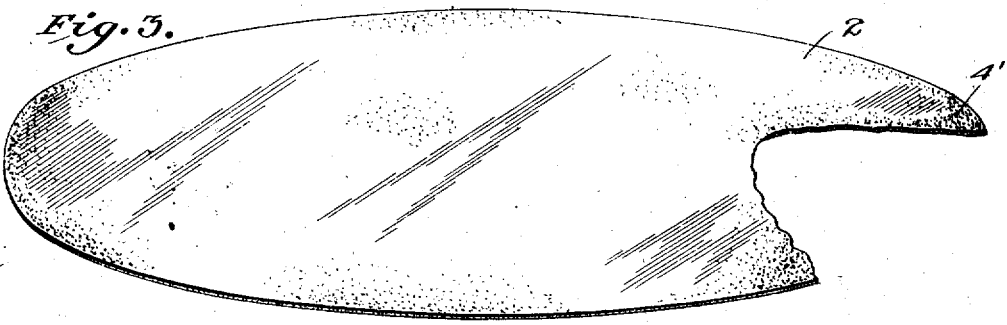
Figure 4:
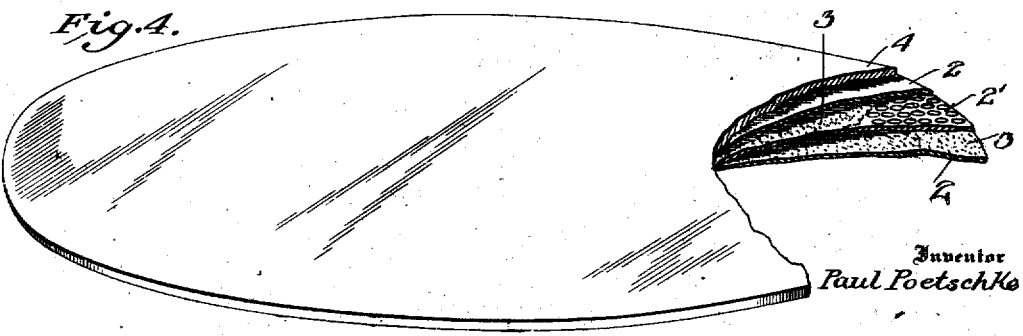

Embodiments of the invention are illustrated in the accompanying drawing, in which, Figure 1 is a sectional view through a record structure of one type, Fig. 2 is a sectional view through a record structure of another type, and Fig. 3 is a sectional view through one of the sheets which is impregnated with a substance to facilitate the application of the impression receiving material, Fig. 4 is a sectional view of a further modified form of the device.

To secure the desired advantages and improvements in my record, over records of the ordinary construction, I prefer to utilize a cement consisting of a base of magnesium-oxychlorid with any suitable filler of an inert or mineral form such as silica or silex, powdered glass, powdered marble, chalk or clay, and as a specific example, I might mention magnesium oxid and silex in about equal parts which are mixed and reduced to a plastic condition in the presence of a solution of magnesium-chlorid of approximately 30° Baumé. The fibrous sheet or paper to be utilized in the construction of the base, may be assembled in any number of layers, between each of which a layer of the cement is introduced, and I may, if desired, introduce any number of perforated sheets as paper, the interstices of which will be filled by the cement.

The laminated structure so formed is allowed to harden preferably, in the presence of heat, about 100° Fahrenheit, although this is not essential, as the cement will harden at higher or lower temperatures. Preferably, the base thus formed is subjected to pressure to facilitate the shaping of the article.

The shaped record body or base, after it is hardened, is coated with any of the usual materials, or any preferred material having the characteristics of receiving and retaining the sound impression, such for instance, as shellac phenol-formaldehyde condensation products, rosin or wax or any combination of these or these and any other material and to facilitate the adhesion or attachment of the record receiving facing to the base, the outer or uppermost layer of paper or fibrous sheet may previously be treated by the application of a thin coat of any suitable material, as for instance, any of those just mentioned, this application being secured, if desired, by previously impregnating the outer sheet before it is assembled in the body structure or this outer sheet may be coated after the body is assembled, however, it is not essential that the base be prepared in any manner for the reception of the facing coat, as satisfactory adhesion may be secured in some instances, without any such previous coatings. It is understood that the article thus manufactured, may be termed a "sound record", and this record may be impressed upon the record receiving surface of the record in any suitable manner, as is well known.

The nature of the invention may be readily comprehended by reference to the drawings in which, in Fig. 1, there is shown a plurality of layers of paper 2—2 connected together as at 3 by the mineral cement, an example of which is cited above, and upon that layer of paper which is outermost of the record body or base, there is provided the sound impression receiving substance 4. To facilitate the adhesion of the record substance to the base, the outer sheet of material 2 is illustrated in Fig. 3 as being impregnated with a vehicle of suitable nature at 4', while in Fig. 2 there is interposed between the record receiving body or spacing 4 and the outer sheet or layer of material 2, a thin coating of material 4ᵃ of a nature which will assist in the adhesion of the spacing 4 to the base.

The sheets 2—2 of which the base is formed may, as above mentioned, be of any suitable number, may be either perforate or imperforate or in any combination of perforate or imperforate sheets, one form of which is illustrated in Fig. 4, in which the outer layer 2 are shown as imperforate and between which are arranged a perforate sheet 2' through the interstices of which the cementitious material will be expressed or contained in the assembling of the layers.

It is to be understood, of course, that the sound record, manufactured by the above described method, may be made either in the form of a plate or disk or in the form of a cylinder, or otherwise shaped as desired.

What is claimed is:

1. A sound record having a laminated body including a mineral cementitious binder having the properties of artificial stone, and an impression surface.

2. A sound record having a laminated structure including a base composed of fibrous layers cemented by a composition of magnesium-oxychlorid and a filler.

3. A sound record having a laminated structure including a base composed of fibrous layers cemented by a composition of magnesium-oxychlorid and an inert filler.

4. A sound record having a body composed of fibrous layers bound by a mineral cementitious intermediate layer.

5. A sound record having a body composed of fibrous layers and a mineral cement binder, and having a coat of material to facilitate adhesion of an impression receiving material.

6. A sound record consisting of layers of paper, and a reinforce of mineral cement, and a record receiving coat.

7. A sound record consisting of a body structure formed of lamina of paper and a cement of magnesium oxid reduced to plastic condition by a solution of magnesium chlorid.

8. A sound record consisting of a body structure of layers of paper, perforate and imperforate, having a cementitious binding, and a record receiving coat.

9. A sound record consisting of a body of layers of paper and a mineral cementitious binder therefor; an outermost facing of record receiving material; and thereunder a material to facilitate attachment of the facing to the body.

10. The method of making a sound record which consists of cementing layers of fiber with a mineral cement having the properties of artificial stone, and then facing the article.

11. The method of making a sound record which consists of cementing under pressure layers of sheets with a mineral cement having the properties of artificial stone, and then facing the article.

12. The method of making a sound record which consists of cementing layers of paper with a cement having the properties of artificial stone, and then facing the article.

13. The method of making a sound record which consists of making a cement of magnesium oxy-chlorid and a filler, building a body of layers of fiber sheets and said cement, allowing the body to harden, and then applying a record receiving facing.

14. The method of making a sound record which consists of making a cement of magnesium oxy-chlorid and a filler, building a body of layers of fiber sheets and said cement, subjecting the body to pressure, allowing the body to harden, and then applying a record receiving facing.

15. The method of making a sound record which consists of making a cement of magnesium oxy-chlorid and a filler, building a body of layers of fiber sheets and said cement, allowing the body to harden, preparing the surface of the body for the application of a facing, and then applying a record receiving facing.

16. The method of making a sound record which consists of making a cement of magnesium oxy-chlorid and a filler, building a body of layers of fiber sheets and said cement, allowing the body to harden, preparing the surface of the body for the application of a facing and then applying a record receiving facing by the application of a thin coat of wax-like material as a foundation.

17. The method of making a sound record which consists of binding a body of fibrous sheets and a cement of magnesium oxychlorid and an inert filler, allowing the body to set, and applying a record receiving material.

In testimony whereof I affix my signature.

PAUL POETSCHKE.